(12) United States Patent
Pattee et al.

(10) Patent No.: US 11,884,403 B2
(45) Date of Patent: Jan. 30, 2024

(54) AIR DISTRIBUTION NOZZLES, AIRCRAFT THAT INCLUDE AIR DISTRIBUTION NOZZLES, AND METHODS OF UTILIZING AIR DISTRIBUTION NOZZLES

(71) Applicant: The Boeing Company, Chicago, IL (US)

(72) Inventors: Timothy D. Pattee, Tacoma, WA (US); William C. Haas, Seattle, WA (US)

(73) Assignee: The Boeing Company, Arlington, VA (US)

( * ) Notice: Subject to any disclaimer, the term of this patent is extended or adjusted under 35 U.S.C. 154(b) by 389 days.

(21) Appl. No.: 17/361,075

(22) Filed: Jun. 28, 2021

(65) Prior Publication Data

US 2022/0073207 A1     Mar. 10, 2022

Related U.S. Application Data (60) Provisional application No. 63/076,048, filed on Sep. 9, 2020.

(51) Int. Cl.
*B64D 13/00* (2006.01)
*B05B 1/04* (2006.01)

(52) U.S. Cl.
CPC .............. *B64D 13/00* (2013.01); *B05B 1/044* (2013.01); *B64D 2013/003* (2013.01)

(58) Field of Classification Search
CPC .... B61D 13/00; B05B 1/044; B64D 2013/003
(Continued)

(56) References Cited

U.S. PATENT DOCUMENTS

| | | |
|---|---|---|
| 2,820,406 A | 1/1958 | Argentieri |
| 3,058,491 A | 10/1962 | Myhre |

(Continued)

FOREIGN PATENT DOCUMENTS

| | | |
|---|---|---|
| CA | 3085629 A1 | 12/2019 |
| DE | 19758275 | 7/1998 |

(Continued)

OTHER PUBLICATIONS

Salikuddin et al., Acoustic and Laser Doppler Anemometer Results for Confluent and 12-Lobed $E^3$ Mixer Exhaust Systems for Subsonic Jet Noise Reduction, National Aeronautics and Space Administration Glenn Research Center, NASA/CR-2002-211597, Sep. 2002. (broken into multiple parts).

(Continued)

*Primary Examiner* — Vivek K Shirsat
(74) *Attorney, Agent, or Firm* — Kolitch Romano Dascenzo Gates LLC (57) ABSTRACT

Air distribution nozzles, aircraft that include air distribution nozzles, and/or methods of utilizing air distribution nozzles are disclosed herein. The air distribution nozzles include an elongate inlet chamber, an elongate outlet chamber, a tapered elongate slot, an inlet port into the elongate inlet chamber, and an elongate outlet port from the elongate outlet chamber. The elongate inlet chamber extends along an inlet chamber length. The elongate outlet chamber extends along the inlet chamber length. The tapered elongate slot extends between, and fluidly interconnects, the elongate inlet chamber and the elongate outlet chamber. The inlet port is configured to receive an inlet fluid flow along an inlet flow axis. The elongate outlet port is configured to discharge an outlet fluid flow along an outlet flow axis that is oriented at a skew angle relative to the inlet flow axis.

20 Claims, 6 Drawing Sheets

(58) Field of Classification Search
USPC .................................... 454/76, 71, 77, 72
See application file for complete search history.

(56) References Cited

U.S. PATENT DOCUMENTS

| | | | |
|---|---|---|---|
| 3,059,564 A | 10/1962 | Curran et al. | |
| 3,513,881 A * | 5/1970 | Kinsell | G05D 23/08 236/93 R |
| 3,687,054 A | 8/1972 | Boberg | |
| 3,768,394 A | 10/1973 | Powlesland | |
| 4,102,357 A | 7/1978 | Charlton | |
| 4,896,588 A | 1/1990 | Monda et al. | |
| 4,971,768 A * | 11/1990 | Ealba | F15D 1/0015 422/177 |
| 5,133,194 A | 7/1992 | Army, Jr. et al. | |
| 5,209,259 A | 5/1993 | Dear et al. | |
| 5,807,171 A | 9/1998 | Felsen | |
| 5,929,396 A | 7/1999 | Awad | |
| 6,024,639 A | 2/2000 | Scherer et al. | |
| 6,413,159 B1 | 7/2002 | Bates, III et al. | |
| 6,920,959 B2 | 7/2005 | Han et al. | |
| 7,100,356 B2 | 9/2006 | Han et al. | |
| 7,409,985 B2 | 8/2008 | Biasiotto et al. | |
| 7,802,651 B2 | 9/2010 | Park et al. | |
| 8,118,648 B2 | 2/2012 | Bruggen et al. | |
| 8,616,944 B2 | 12/2013 | Chambo et al. | |
| 9,011,216 B1 * | 4/2015 | Al-Alusi | B64D 13/00 454/76 |
| 9,067,678 B2 | 6/2015 | Edom et al. | |
| 9,243,735 B2 | 1/2016 | Holmgren | |
| 9,581,163 B2 | 2/2017 | Rivera et al. | |
| 9,783,309 B2 | 10/2017 | Vue et al. | |
| 9,889,939 B2 | 2/2018 | Zhang et al. | |
| 10,081,429 B2 | 9/2018 | Trudeau | |
| 10,197,010 B2 | 2/2019 | Forsyth | |
| 10,220,955 B2 | 3/2019 | Gregory et al. | |
| 2007/0157803 A1 | 7/2007 | McNeil et al. | |
| 2009/0239463 A1 | 9/2009 | Goenka | |
| 2010/0154468 A1 | 6/2010 | Shaska et al. | |
| 2015/0063995 A1 | 3/2015 | Rivera et al. | |
| 2016/0194086 A1 | 7/2016 | Trudeau | |

FOREIGN PATENT DOCUMENTS

| | | |
|---|---|---|
| DE | 102007019539 | 10/2008 |
| EP | 0292033 A2 | 11/1988 |
| EP | 2851298 | 3/2015 |
| GB | 893999 | 4/1962 |
| JP | 62-228831 | 10/1987 |
| JP | 409122428 A | 5/1997 |
| JP | 2020099580 A | 7/2020 |
| RO | 130182 | 4/2015 |
| WO | WO 1996/025329 A1 | 8/1996 |
| WO | WO9704877 A1 | 2/1997 |
| WO | WO 99/05459 | 2/1999 |
| WO | WO 2005/030582 A1 | 4/2005 |
| WO | WO2007147259 A1 | 12/2007 |

OTHER PUBLICATIONS

Salikuddin et al., Acoustic and Laser Doppler Anemometer Results for Confluent, 22-Lobed, and Unique-Lobed Mixer Exhaust Systems for Subsonic Jet Noise Reduction, National Aeronautics and Space Administration Glenn Research Center, NASA/CR-2002-211598, Sep. 2002. (broken into multiple parts).

European Patent Office, Extended European Search Report for related European Patent Application No. 21190357, dated Jan. 28, 2022.

English language machine translation of Japanese Patent Application Publication No. JP2020099580A, published Jul. 2, 2020.

Machine-generated English language translation for JP 409122428 A, May 13, 1997.

English-language machine translation of the abstract of Japan Patent Application Publication No. 62-228831, Oct. 17, 1987.

English-language machine translation of the abstract of Germany Patent Application Publication No. 19758275, Jul. 23, 1998.

English-language machine translation of the abstract of Germany Patent Application Publication No. 102007019539, Oct. 10, 2008.

English-language machine translation of the abstract of Romania Patent Application Publication No. 130182, Apr. 30, 2015.

Low-Swirl Burner, Turbulent Premixed Combustion Research at Berkeley Lab Center for Computational Sciences and Engineering, downloaded from http://ccse.lbl.gov/Research/Combustion/lowSwirl.html on Jul. 14, 2014.

* cited by examiner

AIR DISTRIBUTION NOZZLES, AIRCRAFT THAT INCLUDE AIR DISTRIBUTION NOZZLES, AND METHODS OF UTILIZING AIR DISTRIBUTION NOZZLES

RELATED APPLICATION

The present application is a non-provisional application claiming priority to U.S. Provisional Patent Application No. 63/076,048, filed on Sep. 9, 2020, entitled "AIR DISTRIBUTION NOZZLES, AIRCRAFT THAT INCLUDE AIR DISTRIBUTION NOZZLES, AND METHODS OF UTILIZING AIR DISTRIBUTION NOZZLES," the complete disclosure of which is incorporated by reference.

FIELD

The present disclosure relates generally to air distribution nozzles, to aircraft that include air distribution nozzles, and/or to methods of utilizing air distribution nozzles.

BACKGROUND

Distribution nozzles may control, direct, and/or regulate a flow of a fluid, such as air, and may be utilized in a variety of applications. As an example, air distribution nozzles may be utilized to form and/or define an air curtain, such as to permit and/or to facilitate different environmental controls on each side of the air curtain. As another example, air distribution nozzles may be utilized to regulate airflow within an aircraft. In a specific example, an air distribution nozzle may be utilized to form and/or to define an air curtain in a cockpit of the aircraft, such as to permit and/or facilitate independent environmental control of a pilot seating area and a co-pilot seating area of the aircraft. Conventional air distribution nozzles are relatively complex, utilize a significant number of separately manufactured and subsequently assembled parts, and/or are relatively expensive. Thus, there exists a need for improved air distribution nozzles, as well as for aircraft that include improved air distribution nozzles and/or improved methods of utilizing improved air distribution nozzles.

SUMMARY

Air distribution nozzles, aircraft that include air distribution nozzles, and/or methods of utilizing air distribution nozzles are disclosed herein. The air distribution nozzles include an elongate inlet chamber, an elongate outlet chamber, a tapered elongate slot, an inlet port into the elongate inlet chamber, and an elongate outlet port from the elongate outlet chamber. The elongate inlet chamber extends along an inlet chamber length. The elongate outlet chamber extends along the inlet chamber length. The tapered elongate slot extends between, and fluidly interconnects, the elongate inlet chamber and the elongate outlet chamber. The inlet port is configured to receive an inlet fluid flow along an inlet flow axis and in an inlet flow direction. The elongate outlet port is configured to discharge an outlet fluid flow along an outlet flow axis and in an outlet flow direction. The outlet flow axis is oriented at a skew angle relative to the inlet flow axis.

The aircraft include the air distribution nozzle and an air supply conduit configured to provide the inlet fluid flow to the inlet port. The methods include providing the inlet fluid flow to the elongate inlet chamber via the inlet port and along the inlet flow direction. The methods also include redirecting the inlet fluid flow within the elongate inlet chamber. The redirecting includes redirecting to generate a slot fluid flow that flows through the tapered elongate slot and into the elongate outlet chamber. The methods further include generating a pair of counter-rotating vortices in the elongate outlet chamber and within the slot fluid flow. The methods also include discharging the outlet fluid flow from the elongate outlet port and along the outlet flow direction.

DESCRIPTION

FIGS. 1-9 provide illustrative, non-exclusive examples of air distribution nozzles 100, of aircraft 10, and/or of methods according to the present disclosure. Elements that serve a similar, or at least substantially similar, purpose are labeled with like numbers in each of FIGS. 1-9, and these elements may not be discussed in detail herein with reference to each of FIGS. 1-9. Similarly, all elements may not be labeled in each of FIGS. 1-9, but reference numerals associated therewith may be utilized herein for consistency. Elements, components, and/or features that are discussed herein with reference to one or more of FIGS. 1-9 may be included in and/or utilized with any of FIGS. 1-9 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

Figure 1:
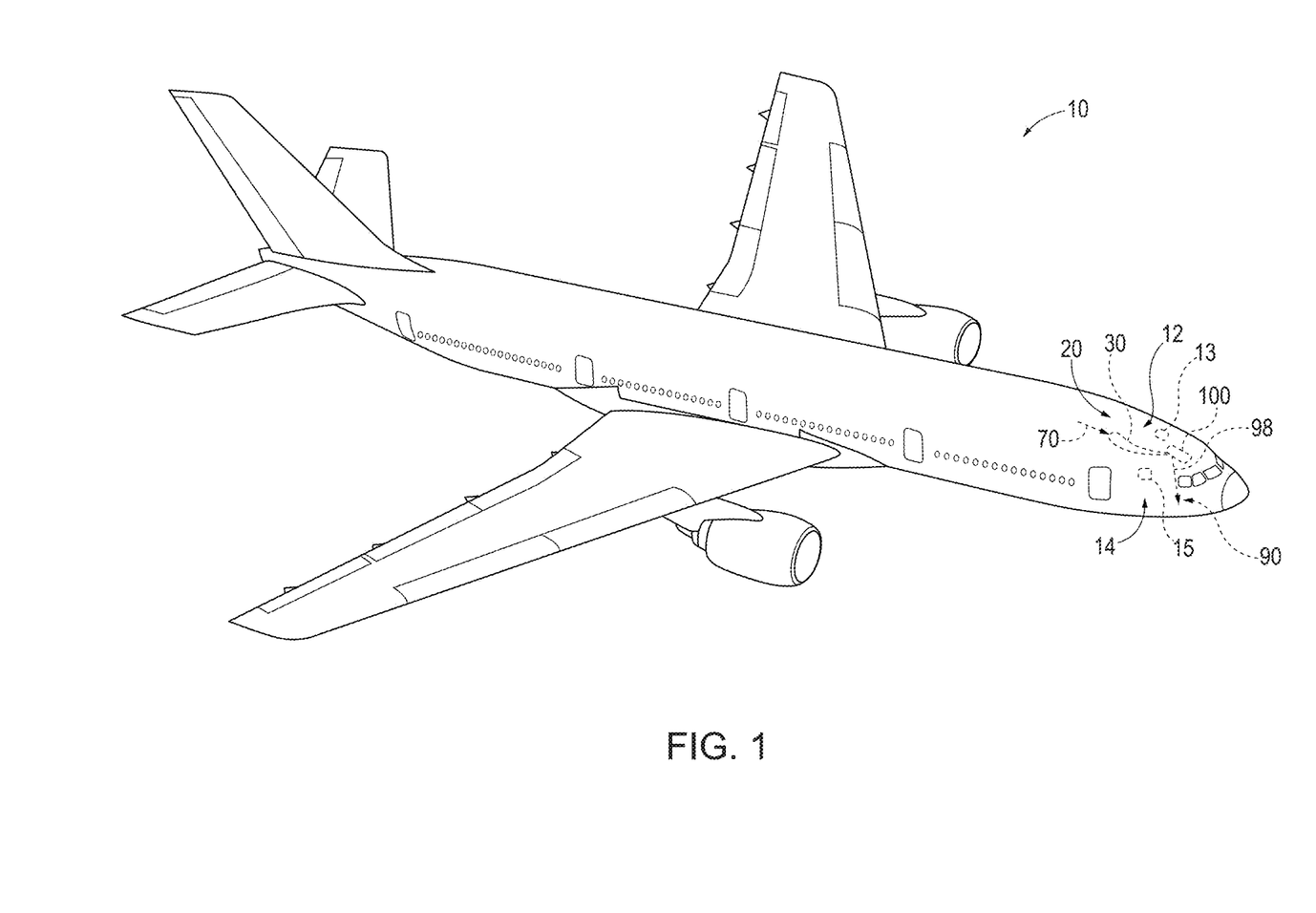
FIG. 1 is a schematic illustration of examples of an aircraft that may include and/or utilize an air distribution nozzle, according to the present disclosure.

FIG. 1 is a schematic illustration of examples of an aircraft 10 that may include and/or utilize an air distribution nozzle 100, according to the present disclosure. Aircraft 10 also may include an air supply conduit 30, which may be configured to provide an inlet fluid flow 70 to air distribution nozzle 100. Air distribution nozzles 100, according to the present disclosure, may be configured to control, to direct, and/or to regulate fluid, or air, flow within aircraft 10 in any suitable manner. Examples of air distribution nozzles 100 are disclosed herein.

As an example, air distribution nozzles 100 may be positioned within a cockpit 20 of aircraft 10. In some such examples, air distribution nozzles 100 may be configured to generate an outlet fluid flow 90 that may function as an air curtain 98. In some examples, air curtain 98 may flow between a pilot seating area 12 and a co-pilot seating area 14 of aircraft 10, such as to permit, facilitate, and/or enable independent environmental control between the pilot seating area and the co-pilot seating area. Stated another way, air curtain 98 may restrict airflow between pilot seating area 12 and co-pilot seating area 14, thereby permitting independent adjustment of a pilot environmental control 13 and a co-pilot environmental control 15 such that, for example, a pilot temperature within pilot seating area 12 may be maintained different and/or independent from a co-pilot temperature within co-pilot seating area 14. In some examples, air curtain 98 may decrease a potential for cross-contamination between pilot seating area 12 and co-pilot seating area 14. Stated another way, air curtain 98 may entrain airborne contaminants, such as particulate material, bacteria, and/or viruses, thereby decreasing flow of the airborne contaminants between pilot seating area 12 and co-pilot seating area 14.

Figure 2:
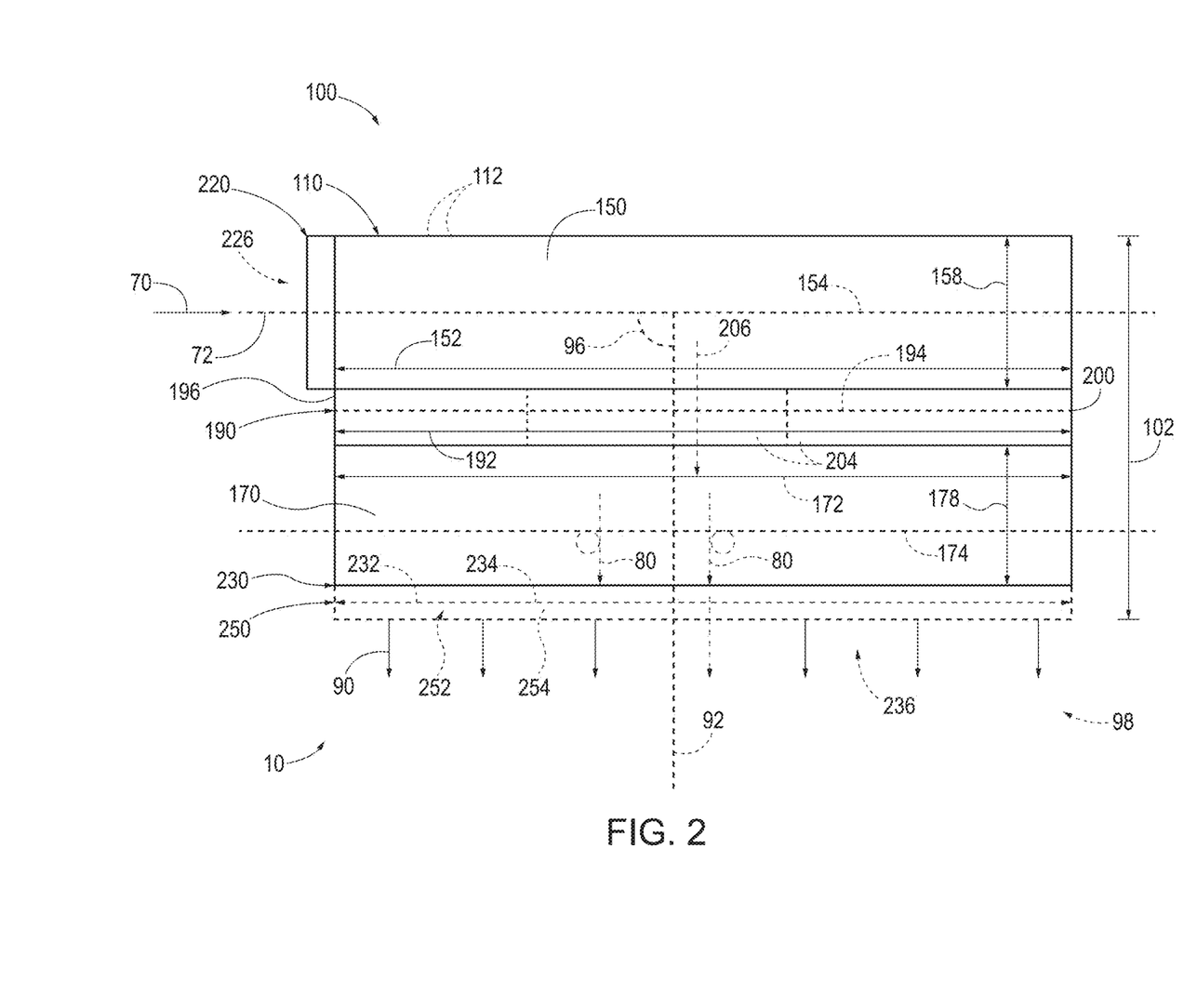
FIG. 2 is a schematic illustration of examples of an air distribution nozzle according to the present disclosure.
Figure 3:
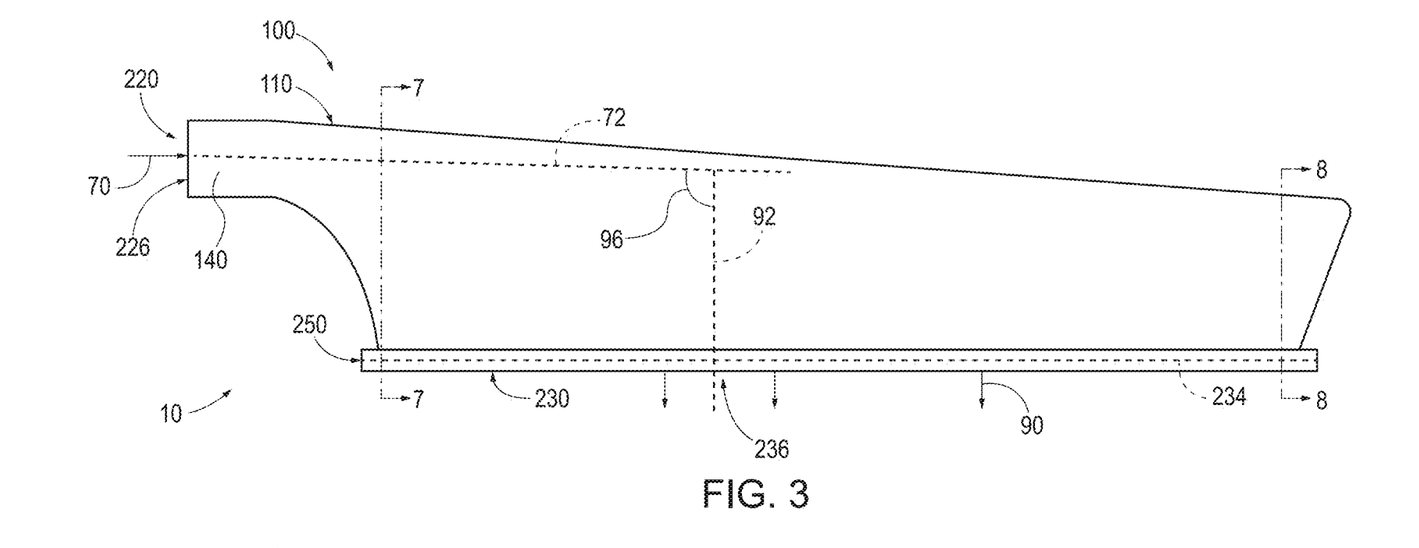
FIG. 3 is a less schematic side view illustrating an example of an air distribution nozzle according to the present disclosure.
Figure 4:
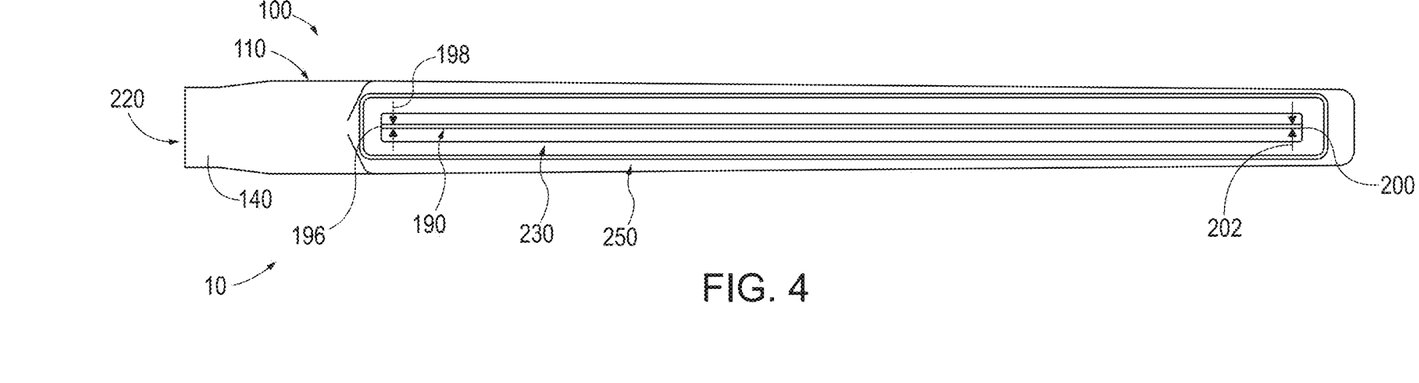
FIG. 4 is a bottom view of the air distribution nozzle of FIG. 3.
Figure 5:
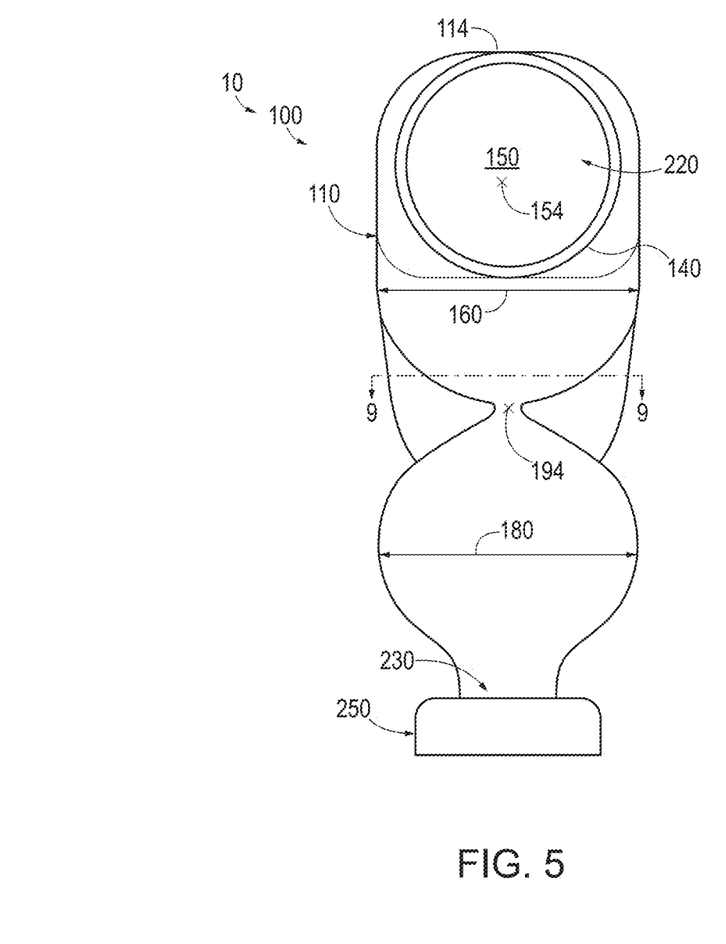
FIG. 5 is a left end view of the air distribution nozzle of FIG. 3.
Figure 6:
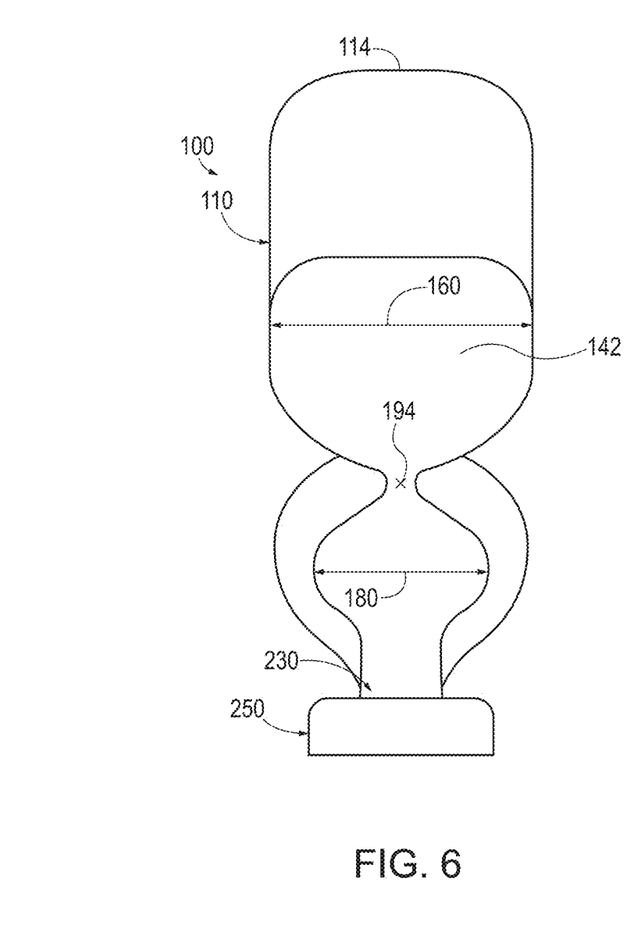
FIG. 6 is a right end view of the air distribution nozzle of FIG. 3.
Figure 7:
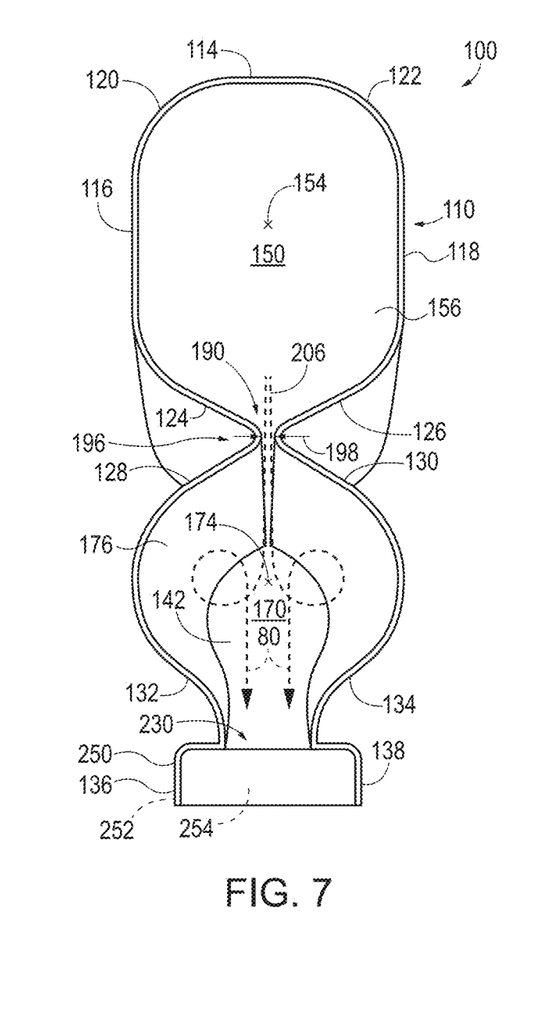
FIG. 7 is a cross-sectional view of the air distribution nozzle of FIG. 3 taken along line 7-7 of FIG. 3.
Figure 8:
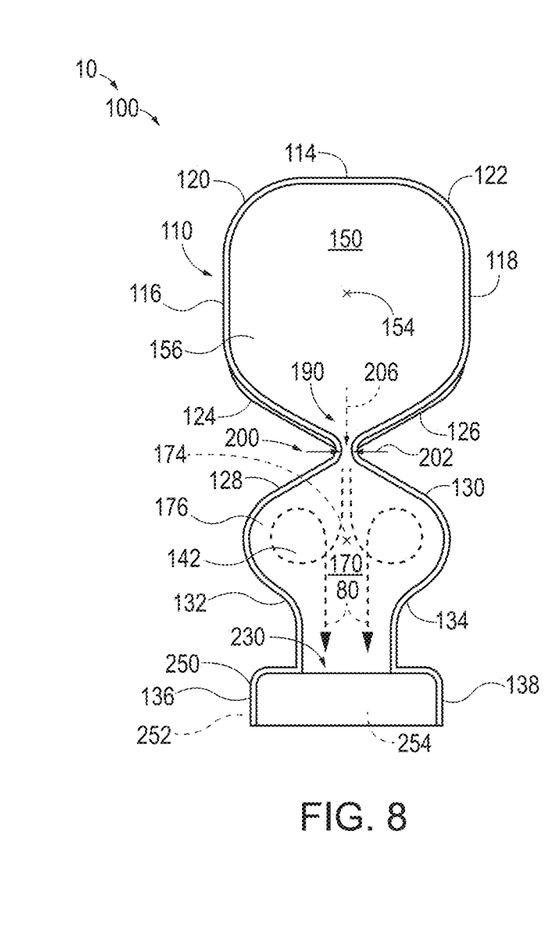
FIG. 8 is a cross-sectional view of the air distribution nozzle of FIG. 3 taken along line 8-8 of FIG. 3.
Figure 9:
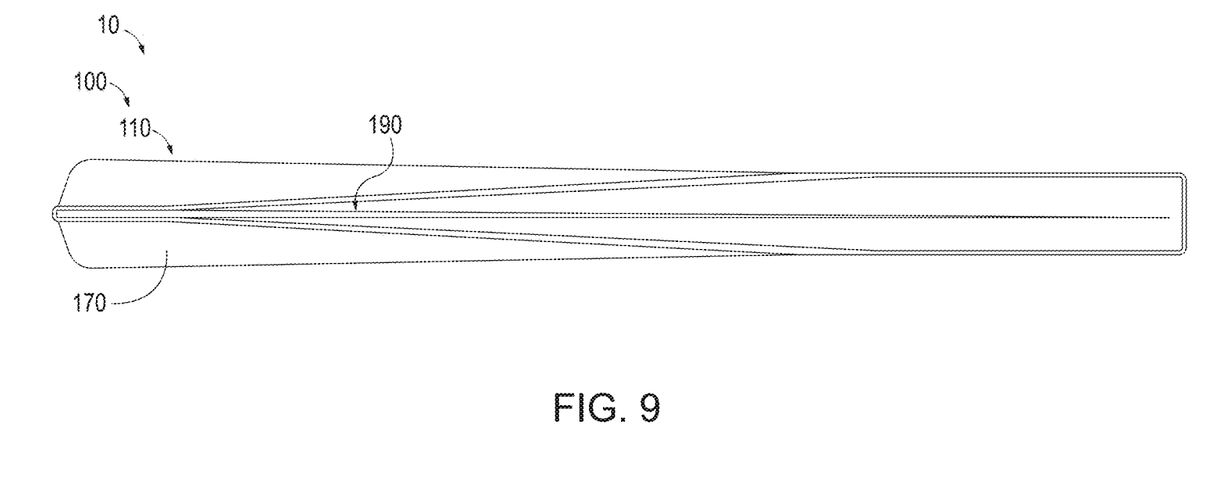
FIG. 9 is a cross-sectional view of the air distribution nozzle of FIG. 3 taken along line 9-9 of FIG. 5.

FIG. 2 is a schematic illustration of examples of an air distribution nozzle 100 according to the present disclosure. FIG. 3 is a less schematic side view illustrating an example of an air distribution nozzle 100 according to the present disclosure, while FIGS. 4-9 provide additional views of air distribution nozzle 100 of FIG. 3. More specifically, FIG. 4 is a bottom view of the air distribution nozzle of FIG. 3, FIG. 5 is a left end view of the air distribution nozzle of FIG. 3, FIG. 6 is a right end view of the air distribution nozzle of FIG. 3, FIG. 7 is a cross-sectional view of the air distribution nozzle of FIG. 3 taken along line 7-7 of FIG. 3, FIG. 8 is a cross-sectional view of the air distribution nozzle of FIG. 3 taken along line 8-8 of FIG. 3, and FIG. 9 is a cross-sectional view of the air distribution nozzle of FIG. 3 taken along line 9-9 of FIG. 5.

Air distribution nozzles 100 of FIGS. 2-9 may include and/or be more detailed illustrations of air distribution nozzles 100 of FIG. 1. With this in mind, any of the structures, functions, and/or features of air distribution nozzles 100 of FIGS. 2-9 may be included in and/or utilized with aircraft 10 of FIG. 1 and/or air distribution nozzles 100 thereof without departing from the scope of the present disclosure. Similarly, any of the structures, functions, and/or features of aircraft 10 of FIG. 1 may be utilized with air distribution nozzles 100 of FIGS. 2-9 without departing from the scope of the present disclosure.

As illustrated in FIG. 2, and collectively by FIGS. 3-9, air distribution nozzles 100 include an elongate inlet chamber 150 and an elongate outlet chamber 170. Elongate inlet chamber 150 extends along an inlet chamber length 152, as illustrated in FIG. 2, and elongate outlet chamber 170 extends, or also extends, along the inlet chamber length. Air distribution nozzles 100 also include a tapered elongate slot 190. Tapered elongate slot 190 extends between, and fluidly interconnects, elongate inlet chamber 150 and elongate outlet chamber 170.

Air distribution nozzles 100 further include an inlet port 220 into elongate inlet chamber 150 and an elongate outlet port 230 from elongate outlet chamber 170. Inlet port 220 is configured to receive an inlet fluid flow 70 along an inlet flow axis 72 and/or in an inlet flow direction (as indicated by the arrow on inlet fluid flow 70). Elongate outlet port 230 is configured to discharge an outlet fluid flow 90 along an outlet flow axis 92 and/or in an outlet flow direction (as indicated by the arrow on outlet fluid flow 90). Outlet flow axis 92 is oriented at a skew angle 96 relative to inlet flow axis 72. Stated another way, the inlet flow direction may be referred to herein as being at skew angle 96 relative to the outlet flow direction.

During operation of air distribution nozzles 100 and/or of aircraft 10 that include air distribution nozzles 100, inlet fluid flow 70 may be provided to elongate inlet chamber 150 via inlet port 220, in the inlet flow direction, and/or along inlet flow axis 72. This may include providing inlet fluid flow 70 via air supply conduit 30 of FIG. 1. Inlet fluid flow 70 may be redirected, within elongate inlet chamber 150 to generate a slot fluid flow 206 that flows through tapered elongate slot 190 and/or into elongate outlet chamber 170. Within elongate outlet chamber 170, a pair of counter-rotating vortices 80 may be generated from and/or within slot fluid flow 206. Outlet fluid flow 90, which may be generated from counter-rotating vortices 80, then may be discharged from elongate outlet port 230 along outlet flow axis 92 and/or in the outlet flow direction. Generation of counter-rotating vortices 80 may increase a uniformity, may increase a linearity, and/or may increase a laminarity of outlet fluid flow 90. Stated another way, air distribution nozzles 100 may discharge a linear outlet fluid flow 90 and/or a laminar outlet fluid flow 90. Such a configuration may make outlet fluid flow 90 suitable for certain applications, such as air curtain 98, which is discussed in more detail herein.

With the above in mind, air distribution nozzles 100 may be referred to herein as being configured to redirect inlet fluid flow 70 from the inlet flow direction to the outlet flow direction, such as to produce and/or generate outlet fluid flow 90. This redirection may be such that outlet fluid flow 90 is uniform, or at least substantially uniform, along an outlet port length 232 of elongate outlet port 230, such that the outlet fluid flow is laminar, and/or such that the outlet fluid flow is at least substantially uniformly directed in the outlet flow direction. Additionally or alternatively, this redirection may be such that the outlet flow direction is oriented at the skew angle relative to the inlet flow direction.

Inlet flow axis 72 may have and/or define any suitable orientation, or relative orientation. As an example, inlet flow axis 72 may be perpendicular, or at least substantially perpendicular, to a cross-section, to a transverse cross-section, and/or to a surface that extends across an inlet opening 226 of inlet port 220. As another example, inlet flow axis 72 may be parallel, or at least substantially parallel, to an inlet chamber longitudinal axis 154 of elongate inlet chamber 150, as illustrated in FIG. 2.

Outlet flow axis 92 may have and/or define any suitable orientation, or relative orientation. As an example, outlet flow axis 92 may be perpendicular, or at least substantially perpendicular, to a cross-section, to a transverse cross-section, and/or to a surface that extends across an outlet opening 236 of elongate outlet port 230. As another example, outlet flow axis 92 may be perpendicular, or at least substantially perpendicular, to an outlet port longitudinal axis 234 of elongate outlet port 230.

Skew angle 96 may include and/or be any suitable angle between inlet flow axis 72 and outlet flow axis 92. As examples, skew angle 96 may be at least 45 degrees, at least 50 degrees, at least 55 degrees, at least 60 degrees, at least 65 degrees, at least 70 degrees, at least 75 degrees, at least 80 degrees, at least 85 degrees, at least 90 degrees, at most 135 degrees, at most 130 degrees, at most 125 degrees, at most 120 degrees, at most 115 degrees, at most 110 degrees, at most 105 degrees, at most 100 degrees, at most 95 degrees, and/or at most 90 degrees. In a specific example, skew angle 96 may be equal, or at least substantially equal, to 90 degrees.

Inlet port 220 may have and/or define any suitable shape, configuration, and/or conformation. As an example, inlet port 220 may include and/or be a circular, an at least partially circular, and/or an at least substantially circular inlet port 220. As another example, inlet port 220 may be shaped, sized, and/or oriented to direct inlet fluid flow 70 along, or at least substantially along, inlet chamber longitudinal axis 154. As yet another example, a cross-section of inlet port 220, a transverse cross-section of inlet port 220, and/or inlet opening 226 may be perpendicular, or at least substantially perpendicular, to inlet chamber longitudinal axis 154. Such a configuration may increase a uniformity of inlet fluid flow 70 into and/or within elongate inlet chamber 150.

Elongate outlet port 230 may have and/or define any suitable shape, configuration, and/or conformation. As examples, elongate outlet port 230 may include and/or be a rectangular elongate outlet port 230, an at least substantially rectangular elongate outlet port 230, and/or a rectangular elongate outlet port 230 with rounded corners. In some examples, outlet port longitudinal axis 234 may extend parallel, or at least substantially parallel, to an outlet chamber longitudinal axis 174 of elongate outlet chamber 170.

As discussed, tapered elongate slot 190 may be tapered. Such a configuration may increase a uniformity of flow, or of a flow rate, of slot fluid flow 206, such as by increasing the uniformity of the flow along a tapered slot length 192 of tapered elongate slot 190.

Tapered elongate slot 190 may have and/or define any suitable shape, configuration, and/or conformation that tapers along tapered elongate slot length 192 thereof, that extends between elongate inlet chamber 150 and elongate outlet chamber 170, and/or that fluidly interconnects elongate inlet chamber 150 and elongate outlet chamber 170. In some examples, tapered elongate slot 190 may extend, or may continuously extend, between a first slot end 196 and a second slot end 200. In some examples, and as illustrated in FIG. 2, tapered elongate slot 190 may include a plurality of slot segments 204. In such a configuration, each slot segment of the plurality of slot segments may fluidly interconnect a given region of elongate inlet chamber 150 with a corresponding region of elongate outlet chamber 170.

Tapered elongate slot 190 may taper in any suitable manner. As an example, and as perhaps best illustrated in FIG. 4, tapered elongate slot 190 may define a first slot width 198 at first slot end 196 and a second slot width 202 at second slot end 200. Second slot width 202 may differ from first slot width 198, and both first slot width 198 and second slot width 202 may be measured in a direction that is perpendicular to an elongate axis, or tapered slot length 192, of tapered elongate slot 190. Additionally or alternatively, first slot width 198 and/or second slot width 202 may be measured in a direction that is perpendicular to flow of slot fluid flow 206 through tapered elongate slot 190.

In some examples, and as illustrated, first slot end 196 may be relatively proximate to inlet port 220 and/or second slot end 200 may be relatively distal from inlet port 220. In some examples, first slot width 198 may be greater than second slot width 202. In some examples, tapered elongate slot 190 may taper, taper monotonically, taper linearly, and/or arcuately taper from first slot width 198 to second slot width 202 and/or between first slot width 198 and second slot width 202.

It is within the scope of the present disclosure that first slot width 198 may differ from second slot width 202 by any suitable amount and/or proportion. As examples, a ratio of first slot width 198 to second slot width 202 may be at least 1.1, at least 1.2, at least 1.3, at least 1.4, at least 1.5, at least 1.6, at least 1.7, at least 1.8, at least 1.9, at least 2.0, at most 4.0, at most 3.8, at most 3.6, at most 3.4, at most 3.2, at most 3.0, at most 2.9, at most 2.8, at most 2.7, at most 2.6, at most 2.5, at most 2.4, at most 2.3, at most 2.2, at most 2.1, at most 2.0, at most 1.9, at most 1.8, at most 1.7, at most 1.6, and/or at most 1.5.

Examples of first slot width 198 include widths of at least 1.5 millimeters (mm), at least 1.6 mm, at least 1.7 mm, at least 1.8 mm, at least 1.9 mm, at least 2 mm, at least 2.1 mm, at least 2.2 mm, at least 2.3 mm, at least 2.4 mm, at most 3 mm, at most 2.9 mm, at most 2.8 mm, at most 2.7 mm, at most 2.6 mm, at most 2.5 mm, at most 2.4 mm, at most 2.3 mm, at most 2.2 mm, at most 2.1 mm, and/or at most 2 mm. Examples of second slot width 202 include widths of at least 0.5 mm, at least 0.6 mm, at least 0.7 mm, at least 0.8 mm, at least 0.9 mm, at least 1 mm, at least 1.1 mm, at least 1.2 mm, at least 1.3 mm, at least 1.4 mm, at most 2 mm, at most 1.9 mm, at most 1.8 mm, at most 1.7 mm, at most 1.6 mm, at most 1.5 mm, at most 1.4 mm, at most 1.3 mm, at most 1.2 mm, at most 1.1 mm, and/or at most 1 mm.

Air distribution nozzles 100 and/or components thereof may have and/or define any suitable dimension and/or dimensions, such as may permit and/or facilitate operation and/or utilizing of the air distribution nozzles in a target installation and/or in a desired manner. In some examples, air distribution nozzles 100 may be utilized in environments that are relatively space constrained, such as aircraft 10.

In some examples, elongate inlet chamber 150 may have and/or define inlet chamber length 152, as illustrated in FIG. 2. In some examples, inlet chamber length 152 may be measured along inlet chamber longitudinal axis 154 and/or may be a maximum dimension of elongate inlet chamber 150 as measured along the inlet chamber longitudinal axis. Additionally or alternatively, elongate outlet chamber 170 may have and/or define an outlet chamber length 172, as also illustrated in FIG. 2. In some examples, outlet chamber length 172 may be measured along outlet chamber longitudinal axis 174 and/or may be a maximum dimension of elongate outlet chamber 170 as measured along the outlet chamber longitudinal axis.

In some examples, inlet chamber length 152 may differ from, or be greater than, outlet chamber length 172. As examples, a ratio of inlet chamber length 152 to outlet chamber length 172 may be at least 1.0, at least 1.1, at least 1.2, at least 1.3, at least 1.4, at least 1.5, at most 2.0, at most 1.9, at most 1.8, at most 1.7, at most 1.6, at most 1.5, at most 1.4, at most 1.3, and/or at most 1.2. Examples of inlet chamber length 152 include lengths of at least 300 mm, at least 325 mm, at least 350 mm, at least 375 mm, at least 400 mm, at least 425 mm, at least 450 mm, at least 475 mm, at least 500 mm, at most 600 mm, at most 575 mm, at most 550 mm, at most 525 mm, at most 500 mm, at most 450 mm, at most 425 mm, and/or at most 400 mm.

In some examples, elongate inlet chamber 150 may have and/or define an inlet chamber width, or an average inlet chamber width, 160, as perhaps best illustrated in FIGS. 5-6. In some examples, inlet chamber width 160 may be measured perpendicular, or at least substantially perpendicular, to inlet chamber longitudinal axis 154, to inlet flow axis 72, to a slot longitudinal axis 194 of tapered elongate slot 190, and/or to inlet chamber length 152, as perhaps best illustrated in FIG. 2. Additionally or alternatively, elongate outlet chamber 170 may have and/or define an outlet chamber width, or an average outlet chamber width, 180, as also perhaps best illustrated in FIGS. 5-6. In some examples, outlet chamber width 180 may be measured perpendicular, or at least substantially perpendicular, to outlet chamber longitudinal axis 174, to outlet flow axis 92, to slot longitudinal axis 194, and/or to outlet chamber length 172, as perhaps best illustrated in FIG. 2. Additionally or alternatively, outlet chamber width 180 may be measured parallel to inlet chamber width 160. Examples of inlet chamber width 160 and/or of outlet chamber width 180 include widths of at least 20 mm, at least 25 mm, at least 30 mm, at least 35 mm, at least 40 mm, at least 45 mm, at least 50 mm, at most 75 mm, at most 70 mm, at most 65 mm, at most 60 mm, at most 55 mm, at most 50 mm, at most 45 mm, at most 40 mm, and/or at most 35 mm.

Air distribution nozzles 100 may have and/or define an overall nozzle height, or an average overall nozzle height, 102, as perhaps best illustrated in FIG. 2. In some examples, overall nozzle height 102 may be measured perpendicular, or at least substantially perpendicular, to inlet chamber longitudinal axis 154, to inlet chamber length 152, to outlet chamber longitudinal axis 174, to outlet chamber length 172, to inlet chamber width 160, to outlet chamber width 180, and/or to slot longitudinal axis 194. In some examples, overall nozzle height 102 may be measured parallel, or at least substantially parallel, to outlet flow axis 92. Examples of overall nozzle height 102 include heights of at least 75 mm, at least 80 mm, at least 85 mm, at least 90 mm, at least 95 mm, at least 100 mm, at least 105 mm, at least 110 mm, at least 115 mm, at least 120 mm, at most 150 mm, at most 145 mm, at most 140 mm, at most 135 mm, at most 130 mm, at most 125 mm, at most 120 mm, at most 115 mm, at most 110 mm, and/or at most 105 mm.

With continued reference to FIG. 2, elongate inlet chamber 150 may have and/or define an inlet chamber height 158. Additionally or alternatively, elongate outlet chamber 170 may have and/or define an outlet chamber height 178. Inlet chamber height 158 and outlet chamber height 178 each may be a, a different, and/or a corresponding fraction, or percentage, of overall nozzle height 102. Examples of the fraction include at least 10%, at least 15%, at least 20%, at least 25%, at least 30%, at least 35%, at least 40%, at least 45%, at least 50%, at most 75%, at most 60%, at most 55%, at most 50%, at most 45%, at most 40%, at most 35%, at most 30%, and/or at most 25%.

Elongate inlet chamber 150 may include any suitable structure, conformation, and/or configuration that extends along inlet chamber length 152, that may receive inlet fluid flow 70 from inlet port 220, and/or that may provide slot fluid flow 206 to elongate outlet chamber 170 via tapered elongate slot 190. In some examples, elongate inlet chamber 150 may be shaped to direct inlet fluid flow 70 toward and/or into tapered elongate slot 190.

In some examples, and as perhaps best illustrated by FIGS. 7 and 8, a transverse cross-sectional area 156 of elongate inlet chamber 150 may decrease along inlet flow axis 72 and/or in the inlet flow direction. In some such examples, a maximum transverse cross-sectional area 156 of elongate inlet chamber 150 may be relatively proximate inlet port 220, while a minimum transverse cross-sectional area 156 of the elongate inlet chamber may be relatively distal the inlet port. In some such examples, transverse cross-sectional area 156 of elongate inlet chamber 150 may decrease, or monotonically decrease, along the inlet flow axis and/or in the inlet flow direction. In some such examples, maximum transverse cross-sectional area 156 of elongate inlet chamber 150 may be a threshold inlet chamber area multiple of minimum transverse cross-sectional area 156 of the elongate inlet chamber. Examples of the threshold inlet chamber area multiple include multiples of at least 1.05, at least 1.1, at least 1.15, at least 1.2, at least 1.25, at least 1.3, at least 1.35, at least 1.4, at least 1.5, at least 1.6, at least 1.7, at least 1.8, at least 1.9, at most 3.0, at most 2.9, at most 2.8, at most 2.7, at most 2.6, at most 2.5, at most 2.4, at most 2.3, at most 2.2, at most 2.1, at most 2.0, at most 1.9, at most 1.8, at most 1.7, at most 1.6, and/or at most 1.5. Such a configuration may increase uniformity of flow, or of the flow rate, of slot fluid flow 206, such as by increasing the uniformity of the flow along tapered slot length 192 of tapered elongate slot 190.

In some examples, inlet chamber height 158, which also may be referred to herein as a height of elongate inlet chamber 150, may decrease, or monotonically decrease, along inlet flow axis 72 and/or in the inlet flow direction. In some such examples, a maximum value of inlet chamber height 158, which also may be referred to herein as a maximum height of elongate inlet chamber 150, may be at least a threshold inlet chamber height multiple of a minimum value of inlet chamber height 158, which also may be referred to herein as a minimum height of the elongate inlet chamber. Examples of the threshold inlet chamber height multiple include multiples of at least 1.05, at least 1.1, at least 1.15, at least 1.2, at least 1.25, at least 1.3, at least 1.35, at least 1.4, at least 1.5, at least 1.6, at least 1.7, at least 1.8, at least 1.9, at most 3.0, at most 2.9, at most 2.8, at most 2.7, at most 2.6, at most 2.5, at most 2.4, at most 2.3, at most 2.2, at most 2.1, at most 2.0, at most 1.9, at most 1.8, at most 1.7, at most 1.6, and at most 1.5. Such a configuration also may increase uniformity of flow, or of the flow rate, of slot fluid flow 206, such as by increasing the uniformity of the flow along tapered slot length 192 of tapered elongate slot 190.

In some examples, inlet chamber width 160, which also may be referred to herein as a width of elongate inlet chamber 150, may decrease, or monotonically decrease, along inlet flow axis 72 and/or in the inlet flow direction. In some such examples, a maximum value of inlet chamber width 160, which also may be referred to herein as a maximum width of elongate inlet chamber 150, may be at least a threshold inlet chamber width multiple of a minimum value of inlet chamber width 160, which also may be referred to herein as a minimum width of the elongate inlet chamber. Examples of the threshold inlet chamber width multiple include multiples of at least 1.05, at least 1.1, at least 1.15, at least 1.2, at least 1.25, at least 1.3, at least 1.35, at least 1.4, at least 1.5, at least 1.6, at least 1.7, at least 1.8, at least 1.9, at most 3.0, at most 2.9, at most 2.8, at most 2.7, at most 2.6, at most 2.5, at most 2.4, at most 2.3, at most 2.2, at most 2.1, at most 2.0, at most 1.9, at most 1.8, at most 1.7, at most 1.6, and at most 1.5. Such a configuration also may increase uniformity of flow, or of the flow rate, of slot fluid flow 206, such as by increasing the uniformity of the flow along tapered slot length 192 of tapered elongate slot 190.

Elongate outlet chamber 170 may include any suitable structure, conformation, and/or configuration that extends along outlet chamber length 172, that may receive slot fluid flow 206 from tapered elongate slot 190, that may generate counter-rotating vortices 80, and/or that may discharge outlet fluid flow 90, such as via elongate outlet port 230. In some examples, elongate outlet chamber 170 may be shaped to generate counter-rotating vortices 80 and/or to direct slot fluid flow 206 toward elongate outlet port 230 as outlet fluid flow 90.

In some examples, and as perhaps best illustrated by FIGS. 7 and 8, a transverse cross-sectional area 176 of elongate outlet chamber 170 may decrease along inlet flow axis 72 and/or in the inlet flow direction. In some such examples, a maximum transverse cross-sectional area 176 of elongate outlet chamber 170 may be relatively proximate inlet port 220, while a minimum transverse cross-sectional area 176 of the elongate outlet chamber may be relatively distal the inlet port. In some such examples, transverse cross-sectional area 176 of elongate outlet chamber 170 may decrease, or monotonically decrease, along the inlet flow axis and/or in the inlet flow direction. In some such examples, maximum transverse cross-sectional area 176 of elongate outlet chamber 170 may be a threshold outlet chamber area multiple of minimum transverse cross-sectional area 176 of the elongate outlet chamber. Examples of the threshold outlet chamber area multiple include multiples of at least 1.05, at least 1.1, at least 1.15, at least 1.2, at least 1.25, at least 1.3, at least 1.35, at least 1.4, at least 1.5, at least 1.6, at least 1.7, at least 1.8, at least 1.9, at most 3.0, at most 2.9, at most 2.8, at most 2.7, at most 2.6, at most 2.5, at most 2.4, at most 2.3, at most 2.2, at most 2.1, at most 2.0, at most 1.9, at most 1.8, at most 1.7, at most 1.6, and/or at most 1.5. Such a configuration may increase uniformity of flow, or of the flow rate, of outlet fluid flow 90, such as by increasing the uniformity of the flow along outlet port longitudinal axis 234 of elongate outlet port 230.

In some examples, outlet chamber height 178, which also may be referred to herein as a height of elongate outlet chamber 170, may decrease, or monotonically decrease, along inlet flow axis 72 and/or in the inlet flow direction. In some such examples, a maximum value of outlet chamber height 178, which also may be referred to herein as a maximum height of elongate outlet chamber 170, may be at least a threshold outlet chamber height multiple of a minimum value of outlet chamber height 178, which also may be referred to herein as a minimum height of the elongate outlet chamber. Examples of the threshold outlet chamber height multiple include multiples of at least 1.05, at least 1.1, at least 1.15, at least 1.2, at least 1.25, at least 1.3, at least 1.35, at least 1.4, at least 1.5, at least 1.6, at least 1.7, at least 1.8, at least 1.9, at most 3.0, at most 2.9, at most 2.8, at most 2.7, at most 2.6, at most 2.5, at most 2.4, at most 2.3, at most 2.2, at most 2.1, at most 2.0, at most 1.9, at most 1.8, at most 1.7, at most 1.6, and at most 1.5. Such a configuration may increase uniformity of flow, or of the flow rate, of outlet fluid flow 90, such as by increasing the uniformity of the flow along outlet port longitudinal axis 234 of elongate outlet port 230.

In some examples, outlet chamber width 180, which also may be referred to herein as a width of elongate outlet chamber 170, may decrease, or monotonically decrease, along inlet flow axis 72 and/or in the inlet flow direction. In some such examples, a maximum value of outlet chamber width 180, which also may be referred to herein as a maximum width of elongate outlet chamber 170, may be at least a threshold outlet chamber width multiple of a minimum value of outlet chamber width 180, which also may be referred to herein as a minimum width of the elongate outlet chamber. Examples of the threshold outlet chamber width multiple include multiples of at least 1.05, at least 1.1, at least 1.15, at least 1.2, at least 1.25, at least 1.3, at least 1.35, at least 1.4, at least 1.5, at least 1.6, at least 1.7, at least 1.8, at least 1.9, at most 3.0, at most 2.9, at most 2.8, at most 2.7, at most 2.6, at most 2.5, at most 2.4, at most 2.3, at most 2.2, at most 2.1, at most 2.0, at most 1.9, at most 1.8, at most 1.7, at most 1.6, and at most 1.5. Such a configuration may increase uniformity of flow, or of the flow rate, of outlet fluid flow 90, such as by increasing the uniformity of the flow along outlet port longitudinal axis 234 of elongate outlet port 230.

As illustrated in dashed lines in FIG. 2 and in solid lines in FIGS. 3-8, air distribution nozzles 100 may include an elongate exit structure 250. Elongate exit structure 250, when present, may be configured to receive outlet fluid flow 90 from elongate outlet chamber 170 and/or to discharge the outlet fluid flow from air distribution nozzles 100.

In some examples, elongate exit structure 250 may define a diffuser mounting structure 252. Diffuser mounting structure 252, when present, may be adapted, configured, shaped, and/or sized to receive an air diffuser 254 and/or to operatively attach the air diffuser to a remainder of air distribution nozzles 100. In some examples, air distribution nozzles 100 further include air diffuser 254, which may operatively attached to diffuser mounting structure 252. Examples of diffuser mounting structure 252 include a region that is shaped to receive air diffuser 254 and/or any suitable fastener. Examples of air diffuser 254 include a screen, a grill, and/or a louvre. Air diffuser 254, when present, may be configured to diffuse outlet fluid flow 90 and/or to provide a back pressure to elongate outlet chamber 170. Such a configuration may increase a uniformity of flow, or of the flow rate, of outlet fluid flow 90, such as by increasing the uniformity of the flow along outlet port longitudinal axis 234 of elongate outlet port 230.

In some examples, air distribution nozzles 100 may include a nozzle body 110. Nozzle body 110, when present, may define elongate inlet chamber 150, elongate outlet chamber 170, tapered elongate slot 190, inlet port 220, and/or elongate exit structure 250. In some such examples, nozzle body 110 may include and/or be a monolithic, or a unitary, nozzle body 110, such as may be formed and/or defined by an additive manufacturing process. In some examples, and as illustrated in FIG. 2, nozzle body 110 may include and/or be a composite nozzle body 110, which may be defined by at least two, or by only two, body components 112, which may be operatively attached to one another to define the nozzle body. In some examples, body components 112 may be shaped to be mirror, or at least substantially mirror, images of one another.

Nozzle body 110 may define the various components of air distribution nozzles 100 in any suitable manner. As an example, and as perhaps best illustrated in FIGS. 7-8, nozzle body 110 may include an upper region 114, which may define an upper surface of elongate inlet chamber 150. As another example, nozzle body 110 may define a first inlet chamber side region 116, which may define a first side of elongate inlet chamber 150, and/or a second inlet chamber side region 118, which may define a second side of the elongate inlet chamber. As yet another example, nozzle body 110 may define a first inlet chamber transition region 120, which may transition from upper region 114 to first inlet chamber side region 116, and/or a second inlet chamber transition region 122, which may transition from upper region 114 to second inlet chamber side region 118.

As another example, nozzle body 110 may define a first inlet chamber tapered region 124, which may taper from first inlet chamber side region 116 to at least partially define a first side of tapered elongate slot 190, and/or a second inlet chamber tapered region 126, which may taper from second inlet chamber side region 118 to at least partially define a second side of tapered elongate slot 190. As illustrated, first inlet chamber tapered region 124 and second inlet chamber tapered region 126 may taper toward one another.

As yet another example, nozzle body 110 may define a first upper outlet chamber tapered region 128, which may extend from first inlet chamber tapered region 124 and/or may taper away from tapered elongate slot 190, and/or a second upper outlet chamber tapered region 130, which may extend from second inlet chamber tapered region 126 and/or may taper away from the tapered elongate slot. First upper outlet chamber tapered region 128 and second upper outlet chamber tapered region 130 may taper away from one another.

As another example, nozzle body 110 may define a first lower outlet chamber tapered region 132, which may extend from first upper outlet chamber tapered region 128 to define a first side of elongate outlet port 230, and/or a second lower outlet chamber tapered region 134, which may extend from second upper outlet chamber tapered region 130 to define a second side of elongate outlet port 230. First lower outlet chamber tapered region 132 and second lower outlet chamber tapered region 134 may taper toward one another.

As yet another example, nozzle body 110 may define a first exit structure side region 136, which may extend from first lower outlet chamber tapered region 132 to define a first side of elongate exit structure 250. As another example, nozzle body 110 may define a second exit structure side region 138, which may extend from second lower outlet chamber tapered region 134 to define a second side of the elongate exit structure.

As another example, nozzle body 110 may define an inlet region 140, as perhaps best illustrated in FIGS. 3-5. Inlet region 140 may at least partially define inlet port 220 and/or may extend from upper region 114, first inlet chamber side region 116, and/or second inlet chamber side region 118.

As yet another example, nozzle body 110 may define an end region 142, as perhaps best illustrated in FIG. 6. End region 142 may define an inlet-distal end of air distribution nozzle 100. Additionally or alternatively, end region 142 may extend from upper region 114, from first inlet chamber side region 116, from second inlet chamber side region 118, from first inlet chamber transition region 120, from second inlet chamber transition region 122, from first inlet chamber tapered region 124, from second inlet chamber tapered region 126, from first upper outlet chamber tapered region 128, from second upper outlet chamber tapered region 130, from first lower outlet chamber tapered region 132, from second lower outlet chamber tapered region 134, from first exit structure side region 136, and/or from second exit structure side region 138.

Air distribution nozzles 100, according to the present disclosure, may be relatively simpler and/or may include fewer components when compared to conventional air distribution nozzles. Such conventional air distribution nozzles often rely upon internal baffles, flow straighteners, and/or flow guides to provide the desired level of fluid flow uniformity, thereby making the conventional air distribution nozzles more expensive and/or complex to manufacture, to install, and/or to maintain. With the above in mind, and in view of the illustrations of air distribution nozzles 100 shown in FIGS. 2-9, it is within the scope of the present disclosure that air distribution nozzles 100, according to the present disclosure, may not include, or may be free from, baffles, flow straighteners, and/or flow guides that may extend and/or project within and/or between elongate inlet chamber 150, elongate outlet chamber 170, tapered elongate slot 190, inlet port 220, and/or elongate outlet port 230.

Illustrative, non-exclusive examples of inventive subject matter according to the present disclosure are described in the following enumerated paragraphs:

A1. An air distribution nozzle (100), comprising:
 an elongate inlet chamber (150) that extends along an inlet chamber length (152);
 an elongate outlet chamber (170) that extends along the inlet chamber length (152);
 a tapered elongate slot (190) that extends between, and fluidly interconnects, the elongate inlet chamber (150) and the elongate outlet chamber (170);
 an inlet port (220) into the elongate inlet chamber (150), wherein the inlet port (220) is configured to receive an inlet fluid flow (70) at least one of along an inlet flow axis (72) and in an inlet flow direction; and
 an elongate outlet port (230) from the elongate outlet chamber (170), wherein the elongate outlet port (230) is configured to discharge an outlet fluid flow (90) at least one of along an outlet flow axis (92) and in an outlet flow direction, and further wherein the outlet flow axis (92) is oriented at a skew angle (96) relative to the inlet flow axis (72).

A2. The air distribution nozzle (100) of paragraph A1, wherein the inlet flow axis (72) is at least one of:
 (i) perpendicular, or at least substantially perpendicular, to a transverse cross-section of the inlet port (220); and
 (ii) parallel, or at least substantially parallel, to an inlet chamber longitudinal axis (154) of the elongate inlet chamber (150).

A3. The air distribution nozzle (100) of any of paragraphs A1-A2, wherein the outlet flow axis (92) is at least one of:
 (i) perpendicular, or at least substantially perpendicular, to a transverse cross-section of the elongate outlet port (230);
 (ii) perpendicular, or at least substantially perpendicular, to an outlet port longitudinal axis (234) of the elongate outlet port (230); and
 (iii) perpendicular, or at least substantially perpendicular, to an outlet chamber longitudinal axis (174) of the elongate outlet chamber (170).

A4. The air distribution nozzle (100) of any of paragraphs A1-A3, wherein the skew angle (96) is at least one of:
 (i) at least 45 degrees, at least 50 degrees, at least 55 degrees, at least 60 degrees, at least 65 degrees, at least 70 degrees, at least 75 degrees, at least 80 degrees, at least 85 degrees, or at least 90 degrees;
 (ii) at most 135 degrees, at most 130 degrees, at most 125 degrees, at most 120 degrees, at most 115 degrees, at most 110 degrees, at most 105 degrees, at most 100 degrees, at most 95 degrees, or at most 90 degrees; and
 (iii) at least substantially equal to 90 degrees.

A5. The air distribution nozzle (100) of any of paragraphs A1-A4, wherein the inlet port (220) is a circular, at least partially circular, or at least substantially circular, inlet port (220).

A6. The air distribution nozzle (100) of any of paragraphs A1-A5, wherein the inlet port (220) is oriented to direct the inlet fluid flow (70) along, or at least substantially along, an/the inlet chamber longitudinal axis (154) of the elongate inlet chamber (150).

A7. The air distribution nozzle (100) of any of paragraphs A1-A6, wherein a/the transverse cross-section of the inlet port (220) is perpendicular, or at least substantially perpendicular, to a/the inlet chamber longitudinal axis (154) of the elongate inlet chamber (150).

A8. The air distribution nozzle (100) of any of paragraphs A1-A7, wherein the elongate outlet port (230) is at least one of:
  (i) a rectangular elongate outlet port (230);
  (ii) an at least substantially rectangular elongate outlet port (230); and
  (iii) a rectangular elongate outlet port (230) with rounded corners.

A9. The air distribution nozzle (100) of any of paragraphs A1-A8, wherein a/the outlet port longitudinal axis (234) of the elongate outlet port (230) extends parallel, or at least substantially parallel, to an/the outlet chamber longitudinal axis (174) of the elongate outlet chamber (170).

A10. The air distribution nozzle (100) of any of paragraphs A1-A9, wherein the tapered elongate slot (190) continuously extends between a first slot end (196) and a second slot end (200).

A11. The air distribution nozzle (100) of any of paragraphs A1-A10, wherein the tapered elongate slot (190) includes a plurality of slot segments (204), wherein each slot segment (204) of the plurality of slot segments (204) fluidly interconnects a given region of the elongate inlet chamber (150) with a corresponding region of the elongate outlet chamber (170).

A12. The air distribution nozzle (100) of any of paragraphs A1-A11, wherein the tapered elongate slot (190) defines a first slot width (198) at a/the first slot end (196) of the tapered elongate slot (190) and a second slot width (202), which differs from the first slot width (198), at a/the second slot end (200) of the tapered elongate slot (190).

A13. The air distribution nozzle (100) of paragraph A12, wherein the first slot end (196) of the tapered elongate slot (190) is relatively proximate to the inlet port (220) and the second slot end (200) of the tapered elongate slot (190) is relatively distal from the inlet port (220).

A14. The air distribution nozzle (100) of any of paragraphs A12-A13, wherein the first slot width (198) is greater than the second slot width (202).

A15. The air distribution nozzle (100) of any of paragraphs A12-A14, wherein the tapered elongate slot (190) at least one of:
  (i) tapers monotonically from the first slot width (198) to the second slot width (202);
  (ii) tapers linearly from the first slot width (198) to the second slot width (202); and
  (iii) arcuately tapers from the first slot width (198) to the second slot width (202).

A16. The air distribution nozzle (100) of any of paragraphs A12-A15, wherein a ratio of the first slot width (198) to the second slot width (202) is at least one of:
  (i) at least 1.1, at least 1.2, at least 1.3, at least 1.4, at least 1.5, at least 1.6, at least 1.7, at least 1.8, at least 1.9, or at least 2.0; and
  (ii) at most 4.0, at most 3.8, at most 3.6, at most 3.4, at most 3.2, at most 3.0, at most 2.9, at most 2.8, at most 2.7, at most 2.6, at most 2.5, at most 2.4, at most 2.3, at most 2.2, at most 2.1, at most 2.0, at most 1.9, at most 1.8, at most 1.7, at most 1.6, or at most 1.5.

A17. The air distribution nozzle (100) of any of paragraphs A12-A16, wherein the first slot width (198) is at least one of:
  (i) at least 1.5 millimeters (mm), at least 1.6 mm, at least 1.7 mm, at least 1.8 mm, at least 1.9 mm, at least 2 mm, at least 2.1 mm, at least 2.2 mm, at least 2.3 mm, or at least 2.4 mm; and
  (ii) at most 3 mm, at most 2.9 mm, at most 2.8 mm, at most 2.7 mm, at most 2.6 mm, at most 2.5 mm, at most 2.4 mm, at most 2.3 mm, at most 2.2 mm, at most 2.1 mm, or at most 2 mm.

A18. The air distribution nozzle (100) of any of paragraphs A12-A17, wherein the second slot width (202) is at least one of:
  (i) at least 0.5 mm, at least 0.6 mm, at least 0.7 mm, at least 0.8 mm, at least 0.9 mm, at least 1 mm, at least 1.1 mm, at least 1.2 mm, at least 1.3 mm, or at least 1.4 mm; and
  (ii) at most 2 mm, at most 1.9 mm, at most 1.8 mm, at most 1.7 mm, at most 1.6 mm, at most 1.5 mm, at most 1.4 mm, at most 1.3 mm, at most 1.2 mm, at most 1.1 mm, or at most 1 mm.

A19. The air distribution nozzle (100) of any of paragraphs A1-A18, wherein the elongate inlet chamber (150) defines an/the inlet chamber length (152) and the elongate outlet chamber (170) defines an outlet chamber length (172).

A20. The air distribution nozzle (100) of paragraph A19, wherein at least one of:
  (i) the inlet chamber length (152) is measured along an/the inlet chamber longitudinal axis (154); and
  (ii) the outlet chamber length (172) is measured along an/the outlet chamber longitudinal axis (174).

A21. The air distribution nozzle (100) of any of paragraphs A19-A20, wherein a ratio of the inlet chamber length (152) to the outlet chamber length (172) is at least one of:
  (i) at least 1.0, at least 1.1, at least 1.2, at least 1.3, at least 1.4, or at least 1.5; and
  (ii) at most 2.0, at most 1.9, at most 1.8, at most 1.7, at most 1.6, at most 1.5, at most 1.4, at most 1.3, or at most 1.2.

A22. The air distribution nozzle (100) of any of paragraphs A19-A21, wherein the inlet chamber length (152) is at least one of:
  (i) at least 300 mm, at least 325 mm, at least 350 mm, at least 375 mm, at least 400 mm, at least 425 mm, at least 450 mm, at least 475 mm, or at least 500 mm; and
  (ii) at most 600 mm, at most 575 mm, at most 550 mm, at most 525 mm, at most 500 mm, at most 450 mm, at most 425 mm, or at most 400 mm.

A23. The air distribution nozzle (100) of any of paragraphs A1-A22, wherein the elongate inlet chamber (150) defines an inlet chamber width (160), or an average inlet chamber width (160), and the elongate outlet chamber (170) defines an outlet chamber width (180), or an average outlet chamber width (180).

A24. The air distribution nozzle (100) of paragraph A23, wherein at least one of:
  (i) the inlet chamber width (160) is measured perpendicular, or at least substantially perpendicular, to an/the inlet chamber longitudinal axis (154);
  (ii) the outlet chamber width (180) is measured perpendicular, or at least substantially perpendicular, to an/the outlet chamber longitudinal axis (174);
  (iii) the inlet chamber width (160) is measured perpendicular, or at least substantially perpendicular, to the inlet flow axis (72);
  (iv) the outlet chamber width (180) is measured perpendicular, or at least substantially perpendicular, to the outlet flow axis (92);
  (v) the inlet chamber width (160) is measured perpendicular, or at least substantially perpendicular, to a slot longitudinal axis (194) along which the tapered elongate slot (190) extends; and (vi) the outlet chamber width (180) is measured perpendicular, or at least substantially perpendicular, to the slot longitudinal axis (194).

A25. The air distribution nozzle (100) of any of paragraphs A23-A24, wherein at least one of the inlet chamber width, or an average inlet chamber width, (160) and the outlet chamber width, or an average outlet chamber width, (180) is at least one of:
(i) at least 20 mm, at least 25 mm, at least 30 mm, at least 35 mm, at least 40 mm, at least 45 mm, or at least 50 mm; and
(ii) at most 75 mm, at most 70 mm, at most 65 mm, at most 60 mm, at most 55 mm, at most 50 mm, at most 45 mm, at most 40 mm, or at most 35 mm.

A26. The air distribution nozzle (100) of any of paragraphs A1-A25, wherein the air distribution nozzle (100) defines an overall nozzle height (102), or an average overall nozzle height (102).

A27. The air distribution nozzle (100) of paragraph A26, wherein the overall nozzle height (102) is at least one of:
(i) measured perpendicular, or at least substantially perpendicular, to an/the inlet chamber longitudinal axis (154);
(ii) measured perpendicular, or at least substantially perpendicular, to an/the outlet chamber longitudinal axis (174);
(iii) measured parallel, or at least substantially parallel, to the outlet flow axis (92); and
(iv) measured perpendicular, or at least substantially perpendicular, to an/the slot longitudinal axis (194).

A28. The air distribution nozzle (100) of any of paragraphs A26-A27, wherein the overall nozzle height (102) is at least one of:
(i) at least 75 mm, at least 80 mm, at least 85 mm, at least 90 mm, at least 95 mm, at least 100 mm, at least 105 mm, at least 110 mm, at least 115 mm, or at least 120 mm; and
(ii) at most 150 mm, at most 145 mm, at most 140 mm, at most 135 mm, at most 130 mm, at most 125 mm, at most 120 mm, at most 115 mm, at most 110 mm, or at most 105 mm.

A29. The air distribution nozzle (100) of any of paragraphs A1-A28, wherein a transverse cross-sectional area (156) of the elongate inlet chamber (150) decreases along the inlet flow direction, optionally wherein a maximum transverse cross-sectional area (156) of the elongate inlet chamber (150) is a threshold inlet chamber area multiple of a minimum transverse cross-sectional area (156) of the elongate inlet chamber (150), and further optionally wherein the threshold inlet chamber area multiple is at least one of at least 1.05, at least 1.1, at least 1.15, at least 1.2, at least 1.25, at least 1.3, at least 1.35, at least 1.4, at least 1.5, at least 1.6, at least 1.7, at least 1.8, at least 1.9, at most 3.0, at most 2.9, at most 2.8, at most 2.7, at most 2.6, at most 2.5, at most 2.4, at most 2.3, at most 2.2, at most 2.1, at most 2.0, at most 1.9, at most 1.8, at most 1.7, at most 1.6, and at most 1.5.

A30. The air distribution nozzle (100) of any of paragraphs A1-A29, wherein a height (158) of the elongate inlet chamber (150) decreases along the inlet flow direction, optionally where a maximum height (158) of the elongate inlet chamber (150) is a threshold inlet chamber height multiple of a minimum height (158) of the elongate inlet chamber (150), and further optionally wherein the threshold inlet chamber height multiple is at least one of at least 1.05, at least 1.1, at least 1.15, at least 1.2, at least 1.25, at least 1.3, at least 1.35, at least 1.4, at least 1.5, at least 1.6, at least 1.7, at least 1.8, at least 1.9, at most 3.0, at most 2.9, at most 2.8, at most 2.7, at most 2.6, at most 2.5, at most 2.4, at most 2.3, at most 2.2, at most 2.1, at most 2.0, at most 1.9, at most 1.8, at most 1.7, at most 1.6, and at most 1.5.

A31. The air distribution nozzle (100) of any of paragraphs A1-A30, wherein a width (160) of the elongate inlet chamber (150) decreases along the inlet flow direction, optionally wherein a maximum width (160) of the elongate inlet chamber (150) is at least a threshold inlet chamber width (160) multiple of a minimum width (160) of the elongate inlet chamber (150), and further optionally wherein the threshold inlet chamber width (160) multiple is at least one of at least 1.05, at least 1.1, at least 1.15, at least 1.2, at least 1.25, at least 1.3, at least 1.35, at least 1.4, at least 1.5, at least 1.6, at least 1.7, at least 1.8, at least 1.9, at most 3.0, at most 2.9, at most 2.8, at most 2.7, at most 2.6, at most 2.5, at most 2.4, at most 2.3, at most 2.2, at most 2.1, at most 2.0, at most 1.9, at most 1.8, at most 1.7, at most 1.6, and at most 1.5.

A32. The air distribution nozzle (100) of any of paragraphs A1-A31, wherein the elongate inlet chamber (150) is shaped to direct the inlet fluid flow (70) toward the tapered elongate slot (190).

A33. The air distribution nozzle (100) of any of paragraphs A1-A32, wherein a transverse cross-sectional area (176) of the elongate outlet chamber (170) decreases along the inlet flow direction, optionally wherein a maximum transverse cross-sectional area (176) of the elongate outlet chamber (170) is at least a threshold outlet chamber area multiple of a minimum transverse cross-sectional area (176) of the elongate outlet chamber (170), and further optionally wherein the threshold outlet chamber area multiple is at least one of at least 1.05, at least 1.1, at least 1.15, at least 1.2, at least 1.25, at least 1.3, at least 1.35, at least 1.4, at least 1.5, at least 1.6, at least 1.7, at least 1.8, at least 1.9, at most 3.0, at most 2.9, at most 2.8, at most 2.7, at most 2.6, at most 2.5, at most 2.4, at most 2.3, at most 2.2, at most 2.1, at most 2.0, at most 1.9, at most 1.8, at most 1.7, at most 1.6, and at most 1.5.

A34. The air distribution nozzle (100) of any of paragraphs A1-A33, wherein a height (178) of the elongate outlet chamber (170) decreases along the inlet flow direction, optionally where a maximum height (178) of the elongate outlet chamber (170) is at least a threshold outlet chamber height multiple of a minimum height (178) of the elongate outlet chamber (170), and further optionally wherein the threshold outlet chamber height multiple is at least one of at least 1.05, at least 1.1, at least 1.15, at least 1.2, at least 1.25, at least 1.3, at least 1.35, at least 1.4, at least 1.5, at least 1.6, at least 1.7, at least 1.8, at least 1.9, at most 3.0, at most 2.9, at most 2.8, at most 2.7, at most 2.6, at most 2.5, at most 2.4, at most 2.3, at most 2.2, at most 2.1, at most 2.0, at most 1.9, at most 1.8, at most 1.7, at most 1.6, and at most 1.5.

A35. The air distribution nozzle (100) of any of paragraphs A1-A34, wherein a width (180) of the elongate outlet chamber (170) decreases along the inlet flow direction, optionally wherein a maximum width (180) of the elongate outlet chamber (170) is at least a threshold outlet chamber width multiple of a minimum width (180) of the elongate outlet chamber (170), and further optionally wherein the threshold outlet chamber width multiple is at least one of at least 1.05, at least 1.1, at least 1.15, at least 1.2, at least 1.25, at least 1.3, at least 1.35, at least 1.4, at least 1.5, at least 1.6, at least 1.7, at least 1.8, at least 1.9, at most 3.0, at most 2.9, at most 2.8, at most 2.7, at most 2.6, at most 2.5, at most 2.4, at most 2.3, at most 2.2, at most 2.1, at most 2.0, at most 1.9, at most 1.8, at most 1.7, at most 1.6, and at most 1.5.

A36. The air distribution nozzle (100) of any of paragraphs A1-A35, wherein the inlet chamber (150) is shaped to induce a pair of counter-rotating vortices (80) in fluid flow from the tapered elongate slot (190) to the elongate outlet port (230).

A37. The air distribution nozzle (100) of any of paragraphs A1-A36, wherein the air distribution nozzle (100) further includes an elongate exit structure (250) configured to receive the outlet fluid flow (90) from the elongate outlet port (230).

A38. The air distribution nozzle (100) of paragraph A37, wherein the elongate exit structure (250) defines a diffuser mounting structure (252).

A39. The air distribution nozzle (100) of paragraph A38, wherein the air distribution nozzle (100) further includes an air diffuser (254) operatively attached to the diffuser mounting structure (252), optionally wherein the air diffuser (254) includes at least one of a screen, a grill, and a louvre.

A40. The air distribution nozzle (100) of any of paragraphs A1-A39, wherein the air distribution nozzle (100) includes a nozzle body (110) that defines the elongate inlet chamber (150), the elongate outlet chamber (170), the tapered elongate slot (190), the inlet port (220), and the elongate outlet port (230).

A41. The air distribution nozzle (100) of paragraph A40, wherein the nozzle body (110) is a monolithic nozzle body.

A42. The air distribution nozzle (100) of any of paragraphs A40-A41, wherein the nozzle body (110) is a composite nozzle body (110) defined by at least two body components (112), and optionally only two body components (112), operatively attached to one another to define the nozzle body (110).

A43. The air distribution nozzle (100) of paragraph A42, wherein the at least two body components (112) are shaped to be mirror, or at least substantially mirror, images of one another.

A44. The air distribution nozzle (100) of any of paragraphs A1-A43, wherein the nozzle body (110) includes at least one of:
(i) an upper region (114), which defines an upper surface of the elongate inlet chamber (150);
(ii) a first inlet chamber side region (116), which defines a first side of the elongate inlet chamber (150);
(iii) a second inlet chamber side region (118), which defines a second side of the elongate inlet chamber (150);
(iv) a first inlet chamber transition region (120) that transitions from the upper region (114) to the first inlet chamber side region (116);
(v) a second inlet chamber transition region (122) that transitions from the upper region (114) to the second inlet chamber side region (118);
(vi) a first inlet chamber tapered region (124), which tapers from the first inlet chamber side region (116) to define a first side of the tapered elongate slot (190);
(vii) a second inlet chamber tapered region (126), which tapers from the second inlet chamber side region (118) to define a second side of the tapered elongate slot (190);
(viii) a first upper outlet chamber tapered region (128), which extends from the first inlet chamber tapered region (124) and tapers away from the tapered elongate slot (190);
(ix) a second upper outlet chamber tapered region (130), which extends from the second inlet chamber tapered region (126) and tapers away from the tapered elongate slot (190);
(x) a first lower outlet chamber tapered region (132), which extends from the first upper outlet chamber tapered region (128) to define a first side of the elongate outlet port (230);
(xi) a second lower outlet chamber tapered region (134), which extends from the second upper outlet chamber tapered region (130) to define a second side of the elongate outlet port (230);
(xii) a first exit structure side region (136), which extends from the first lower outlet chamber tapered region (132) to define a first side of the elongate exit structure (250);
(xiii) a second exit structure side region (138), which extends from the second lower outlet chamber tapered region (134) to define a second side of the elongate exit structure (250);
(xiv) an inlet region (140), which at least partially defines the inlet port (220) and extends from at least one of the upper region (114), the first inlet chamber side region (116), and the second inlet chamber side region (118); and
(xv) an end region (142), which defines an inlet-distal end of the air distribution nozzle (100) and extends from at least one of the upper region (114), the first inlet chamber side region (116), the second inlet chamber side region (118), the first inlet chamber transition region (120), the second inlet chamber transition region (122), the first inlet chamber tapered region (124), the second inlet chamber tapered region (126), the first upper outlet chamber tapered region (128), the second upper outlet chamber tapered region (130), the first lower outlet chamber tapered region (132), the second lower outlet chamber tapered region (134), the first exit structure side region (136), and the second exit structure side region (138).

A45. The air distribution nozzle (100) of any of paragraphs A1-A44, wherein the air distribution nozzle (100) is configured to redirect the inlet fluid flow (70) from the inlet flow direction to the outlet flow direction such that at least one of:
(i) the outlet fluid flow (90) is uniform, or at least substantially uniform, along an outlet port length of the elongate outlet port (230);
(ii) the outlet fluid flow (90) is laminar; and
(iii) the outlet fluid flow (90) is at least substantially uniformly directed in the outlet flow direction.

A46. The air distribution nozzle (100) of any of paragraphs A1-A45, wherein at least one of the elongate inlet chamber (150), the elongate outlet chamber (170), the tapered elongate slot (190), the inlet port (220), and the elongate outlet port (230) is free of at least one of:
(i) a baffle;
(ii) a flow straightener; and
(iii) a flow guide.

A47. The air distribution nozzle (100) of any of paragraphs A1-A46, wherein the outlet fluid flow (90) is configured to generate an air curtain (98).

B1. An aircraft (10) comprising:
the air distribution nozzle (100) of any of paragraphs A1-A47; and
an air supply conduit (30) configured to provide the inlet fluid flow (70) to the inlet port (220).

B2. The aircraft (10) of paragraph B1, wherein the air distribution nozzle (100) is positioned within a cockpit (20) of the aircraft (10), and further wherein the outlet fluid flow (90) is configured to generate an air curtain (98) between a pilot seating area (12) of the aircraft (10) and a co-pilot seating area (14) of the aircraft.

C1. A method of utilizing the air distribution nozzle (100) of any of paragraphs A1-A47, the method comprising:

providing the inlet fluid flow (70) to the elongate inlet chamber (150) via the inlet port (220) and along the inlet flow direction;

redirecting, within the elongate inlet chamber (150), the inlet fluid flow (70) to generate a slot fluid flow (206) that flows through the tapered elongate slot (190) and into the elongate outlet chamber (170);

generating, within the elongate outlet chamber (170), a pair of counter-rotating vortices (80) within the slot fluid flow (206); and discharging, from the elongate outlet port (230), the outlet fluid flow (90) along the outlet flow direction.

C2. The method of paragraph C1, wherein the discharging includes discharging such that the outlet flow direction is oriented at the skew angle (96) relative to the inlet flow direction.

C3. The method of any of paragraphs C1-C2, wherein the discharging includes at least one of:
(i) discharging a linear outlet fluid flow (90); and
(ii) discharging a laminar outlet fluid flow (90).

D1. The use of an air distribution nozzle (100) to receive an inlet fluid flow (70) in an inlet flow direction, to redirect the inlet fluid flow (70) to an outlet flow direction that is oriented at a skew angle (96) relative to the inlet flow direction, and to generate an outlet fluid flow (90) that defines an air curtain (98).

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

The invention claimed is:

1. An aircraft, comprising:
an air distribution nozzle that includes:
(i) an elongate inlet chamber that extends along an inlet chamber length;
(ii) an elongate outlet chamber that extends along the inlet chamber length;

(iii) a tapered elongate slot that extends between, and fluidly interconnects, the elongate inlet chamber and the elongate outlet chamber;

(iv) an inlet port into the elongate inlet chamber, wherein the inlet port is configured to receive an inlet fluid flow along an inlet flow axis and in an inlet flow direction; and (v) an elongate outlet port from the elongate outlet chamber, wherein the elongate outlet port is configured to discharge an outlet fluid flow along an outlet flow axis and in an outlet flow direction, and further wherein the outlet flow axis is oriented at a skew angle relative to the inlet flow axis; and an air supply conduit configured to provide the inlet fluid flow to the inlet port, wherein the air distribution nozzle is positioned within a cockpit of the aircraft, and further wherein the outlet fluid flow is configured to generate an air curtain between a pilot seating area of the aircraft and a co-pilot seating area of the aircraft.

2. The aircraft of claim 1, wherein the inlet port is oriented to direct the inlet fluid flow at least substantially along an inlet chamber longitudinal axis of the elongate inlet chamber.

3. The aircraft of claim 1, wherein an outlet port longitudinal axis of the elongate outlet port extends at least substantially parallel to an outlet chamber longitudinal axis of the elongate outlet chamber.

4. The aircraft of claim 1, wherein the tapered elongate slot defines a first slot width at a first slot end of the tapered elongate slot and a second slot width, which differs from the first slot width, at a second slot end of the tapered elongate slot, wherein the first slot end of the tapered elongate slot is relatively proximate to the inlet port and the second slot end of the tapered elongate slot is relatively distal from the inlet port.

5. The aircraft of claim 4, wherein the first slot width is greater than the second slot width.

6. The aircraft of claim 4, wherein the tapered elongate slot at least one of:
(i) tapers monotonically from the first slot width to the second slot width;
(ii) tapers linearly from the first slot width to the second slot width; and
(iii) arcuately tapers from the first slot width to the second slot width.

7. The aircraft of claim 4, wherein a ratio of the first slot width to the second slot width is at least 1.1 and at most 4.0.

8. The aircraft of claim 4, wherein the first slot width is at least 1.5 millimeters (mm) and at most 3 mm.

9. The aircraft of claim 4, wherein the second slot width is at least 0.5 mm and at most 2 mm.

10. The aircraft of claim 1, wherein the elongate inlet chamber defines an inlet chamber length and the elongate outlet chamber defines an outlet chamber length, wherein a ratio of the inlet chamber length to the outlet chamber length is at least 1.0 and at most 2.0.

11. The aircraft of claim 10, wherein the inlet chamber length is at least 300 mm and at most 600 mm.

12. The aircraft of claim 1, wherein the elongate inlet chamber defines an average inlet chamber width and the elongate outlet chamber defines an average outlet chamber width, and further wherein the average inlet chamber width and the average outlet chamber width are at least 20 mm and at most 75 mm.

13. The aircraft of claim 1, wherein the air distribution nozzle defines an average overall nozzle height, and further wherein the average overall nozzle height is at least 75 mm and at most 150 mm.

14. The aircraft of claim 1, wherein:
(i) a transverse cross-sectional area of the elongate inlet chamber decreases along the inlet flow direction; and
(ii) a transverse cross-sectional area of the elongate outlet chamber decreases along the inlet flow direction.

15. The aircraft of claim 1, wherein the air distribution nozzle further includes an elongate exit structure configured to receive the outlet fluid flow from the elongate outlet port, wherein the elongate exit structure defines a diffuser mounting structure, and further wherein the air distribution nozzle includes an air diffuser operatively attached to the diffuser mounting structure.

16. The aircraft of claim 1, wherein the air distribution nozzle includes a nozzle body that defines the elongate inlet chamber, the elongate outlet chamber, the tapered elongate slot, the inlet port, and the elongate outlet port.

17. The aircraft of claim 1, wherein the elongate inlet chamber, the elongate outlet chamber, the tapered elongate slot, the inlet port, and the elongate outlet port are free of:
(i) a baffle;
(ii) a flow straightener; and
(iii) a flow guide.

18. A method of utilizing the aircraft of claim 1, the method comprising:
providing the inlet fluid flow to the elongate inlet chamber via the inlet port and along the inlet flow direction;
redirecting, within the elongate inlet chamber, the inlet fluid flow to generate a slot fluid flow that flows through the tapered elongate slot and into the elongate outlet chamber;
generating, within the elongate outlet chamber, a pair of counter-rotating vortices within the slot fluid flow; and
discharging, from the elongate outlet port, the outlet fluid flow along the outlet flow direction.

19. The method of claim 18, wherein the discharging includes discharging such that the outlet flow direction is oriented at a skew angle relative to the inlet flow direction.

20. The method of claim 18, wherein the discharging includes at least one of:
(i) discharging a linear outlet fluid flow; and
(ii) discharging a laminar outlet fluid flow.

* * * * *